(12) United States Patent
Weidmann

(10) Patent No.: US 7,273,516 B2
(45) Date of Patent: Sep. 25, 2007

(54) PLATE HEAT EXCHANGER

(75) Inventor: Urs A. Weidmann, Cham (CH)

(73) Assignee: Mentus Holding AG (CH)

( * ) Notice: Subject to any disclaimer, the term of this patent is extended or adjusted under 35 U.S.C. 154(b) by 72 days.

(21) Appl. No.: 10/550,233

(22) PCT Filed: Mar. 22, 2004

(86) PCT No.: PCT/CH2004/000173

§ 371 (c)(1),
(2), (4) Date: Sep. 22, 2005

(87) PCT Pub. No.: WO2004/085946

PCT Pub. Date: Oct. 7, 2004

(65) Prior Publication Data

US 2006/0191413 A1    Aug. 31, 2006

(30) Foreign Application Priority Data

Mar. 26, 2003 (CH) ..................................... 0521/03

(51) Int. Cl.
*B03C 3/78* (2006.01)
(52) U.S. Cl. ............ 96/44; 95/73; 95/75; 96/50; 96/53; 96/74; 96/86; 96/87; 96/96; 261/153
(58) Field of Classification Search ............ 96/44, 96/50, 52, 53, 74, 86, 87, 96; 95/71–73, 95/75; 261/153, 155
See application file for complete search history.

(56) References Cited

U.S. PATENT DOCUMENTS

| | | | | |
|---|---|---|---|---|
| 2,825,210 A | | 3/1958 | Carr .......................... 62/310 |
| 3,745,751 A | * | 7/1973 | Zey et al. .................... 422/161 |
| 3,800,505 A | * | 4/1974 | Tarves, Jr. ..................... 95/66 |
| 5,039,318 A | * | 8/1991 | Johansson ....................... 96/74 |
| 5,141,529 A | * | 8/1992 | Oakley et al. ................. 95/57 |
| 5,271,763 A | * | 12/1993 | Jang .............................. 96/55 |
| 5,296,019 A | * | 3/1994 | Oakley et al. ................. 96/95 |
| 6,193,782 B1 | * | 2/2001 | Ray ............................... 95/4 |
| 6,221,136 B1 | * | 4/2001 | Liu et al. ....................... 96/66 |

FOREIGN PATENT DOCUMENTS

| | | |
|---|---|---|
| DE | 198 48 740 A1 | 4/2000 |
| DE | 199 04 607 C1 | 4/2000 |
| DE | 100 59 804 A1 | 6/2002 |

(Continued)

*Primary Examiner*—Richard L. Chiesa
(74) *Attorney, Agent, or Firm*—Lerner, David, Littenberg, Krumholz & Mentlik, LLP

(57) ABSTRACT

A plate heat exchanger for exchanging heat between a first air stream and a second air stream includes a plurality of plates limiting first and second exchange chambers which are serially arranged in a transversal direction with respect to the plates. A first air stream of outside air passes through the first exchange chambers, a second air stream originating from ventilated rooms passes through the second exchange chambers. The heat exchanger further includes an ionization device for ionizing particles entrained in the first air stream so that the particles deposit at conductive plates of the first exchange spaces, a water distribution system for periodically discharging water into the first exchange spaces for cleaning the plates of the heat exchanger from deposited particles, and a water collection device for discharging collected water.

16 Claims, 3 Drawing Sheets

FOREIGN PATENT DOCUMENTS

Figure 1:
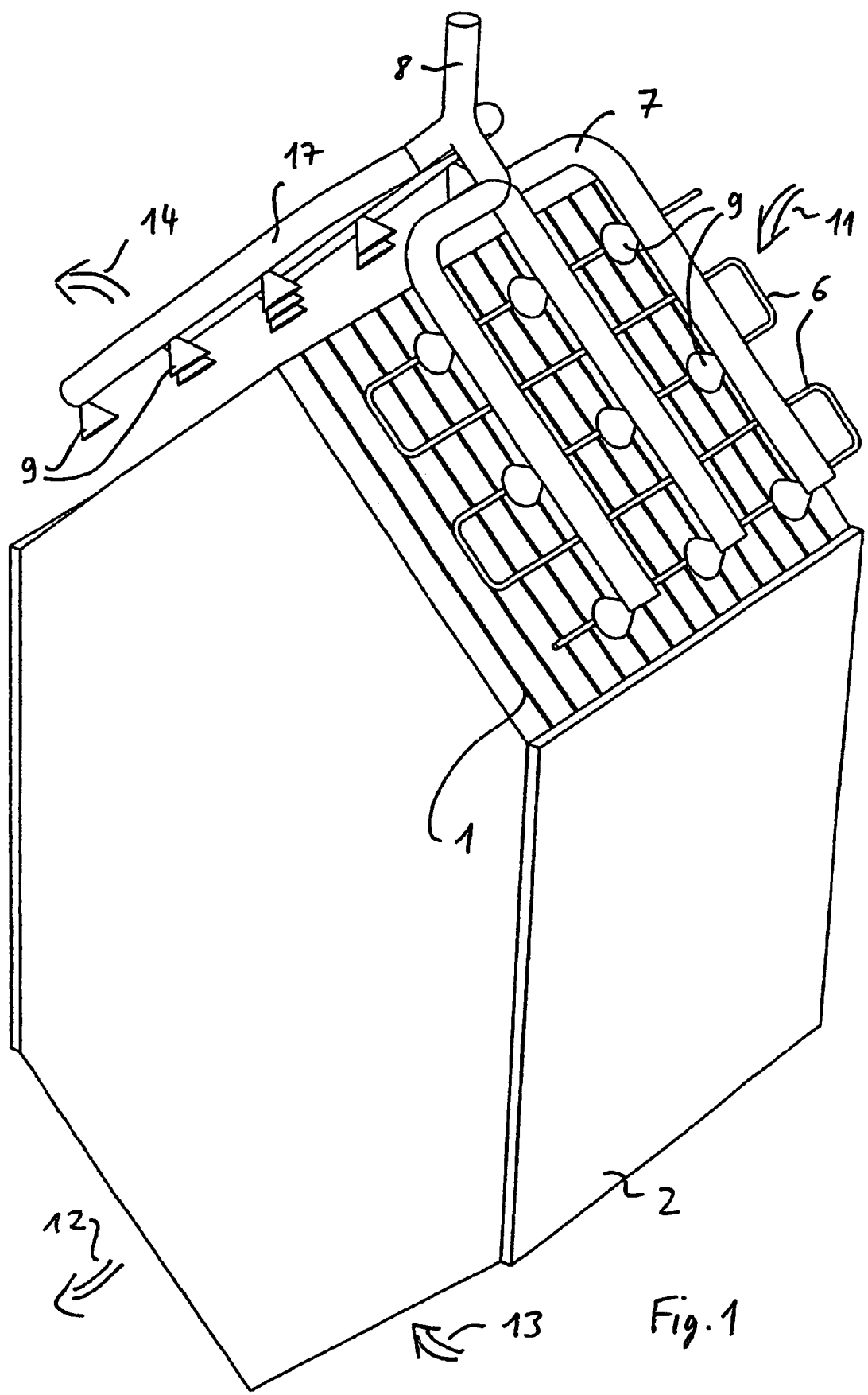

| | | |
|---|---|---|
| EP | 0 959 307 A1 | 11/1999 |
| EP | 1 001 228 A2 | 5/2000 |
| WO | WO-92/04589 A1 | 3/1992 |
| WO | WO-96/22497 A1 | 7/1996 |
| WO | WO-01/52711 A2 | 7/2001 |

* cited by examiner

PLATE HEAT EXCHANGER

The invention relates to a plate heat exchanger for the exchange of heat between a first and a second air stream, with a multiplicity of plates which delimit exchange spaces lying next to one another in the transverse direction with respect to the plates, the first air stream being capable of flowing through some of the exchange spaces and the second air stream being capable of flowing through the rest of the exchange spaces, the second air stream consisting of the exhaust air which originates from the rooms to be ventilated and which, conducted through the exchange spaces of the heat exchanger, is to be discharged as outgoing air outside the rooms to be ventilated.

Plate heat exchangers, by means of which heat energy is exchanged in ventilation systems, are known from the prior art. One disadvantage is that, for the cooling of supplied fresh air or circulating room air, energy-intensive installations have to be provided, normally within the framework of an air-conditioning system or the like.

Furthermore, systems for air purification for heat exchangers are known from the prior art. The rotary heat exchanger described in DE 100 59 804 A1, by means of a metallic body, extracts enthalpy from warm/moist exhaust air and discharges it to incoming air. It is specified that emission electrodes with a direct voltage of more than 10 kV, which are arranged upstream of the air stream, are to be provided when purifying the air of pollution in particulate form, a water jet or compressed-air purification system being provided in the rotary heat exchanger on the discharge side. As a result of the biased spray electrodes, room-air particles are deposited on the heat exchanger which is at ground potential. This separated dust is transferred to the outgoing air stream on the exhaust-air side by compressed air or a water jet. The use of this device is restricted to rotary heat exchangers, since it provides two oppositely directed arrangements of ionization wires and water jet discharge elements.

Proceeding from this prior art, the object on which the invention is based is to specify a plate heat exchanger of the type previously mentioned, which makes it possible to cool supplied air in a very simple way and, moreover, in a way which is highly beneficial for the energy balance.

This object is achieved, according to the invention, in that a water distribution system is provided, by means of which water can be discharged into the exchange spaces of the second air stream.

Since water can be discharged into the region of the exchange spaces of the second air stream, on the one hand, a cooling effect is brought about directly by the water itself. On the other hand, and above all, the temperature of the second air stream in said exchange space is lowered as a result of evaporation cooling. Consequently, the exhaust air cools due to contact and evaporation, and the temperature of the outside air is lowered by the heat exchanger, on hot summer days, therefore, this outside air being conducted as cooler air into the rooms to be ventilated.

Advantageously, the water distribution system has a multiplicity of nozzles, by means of which the water is sprayed as a fine mist and passes thus into the exchange space.

Preferably, such an embodiment is configured at the same time with a purification system for purifying the supplied air, at least of particles. In this case, at least parts of the plates belonging to each exchange space of the first air stream may be designed conductively. In the region of the supply of the first air stream, an ionization device is provided, by means of which particles entrained in the air stream are ionized, so that these are deposited on said conductive plates in the exchange spaces of the first air stream and are washed out intermittently by flushing via the water distribution system.

The advantage of the installation presented is, in addition to the simplicity of the construction, the maintenance friendliness which predestines it for use in private houses.

Figure 2:
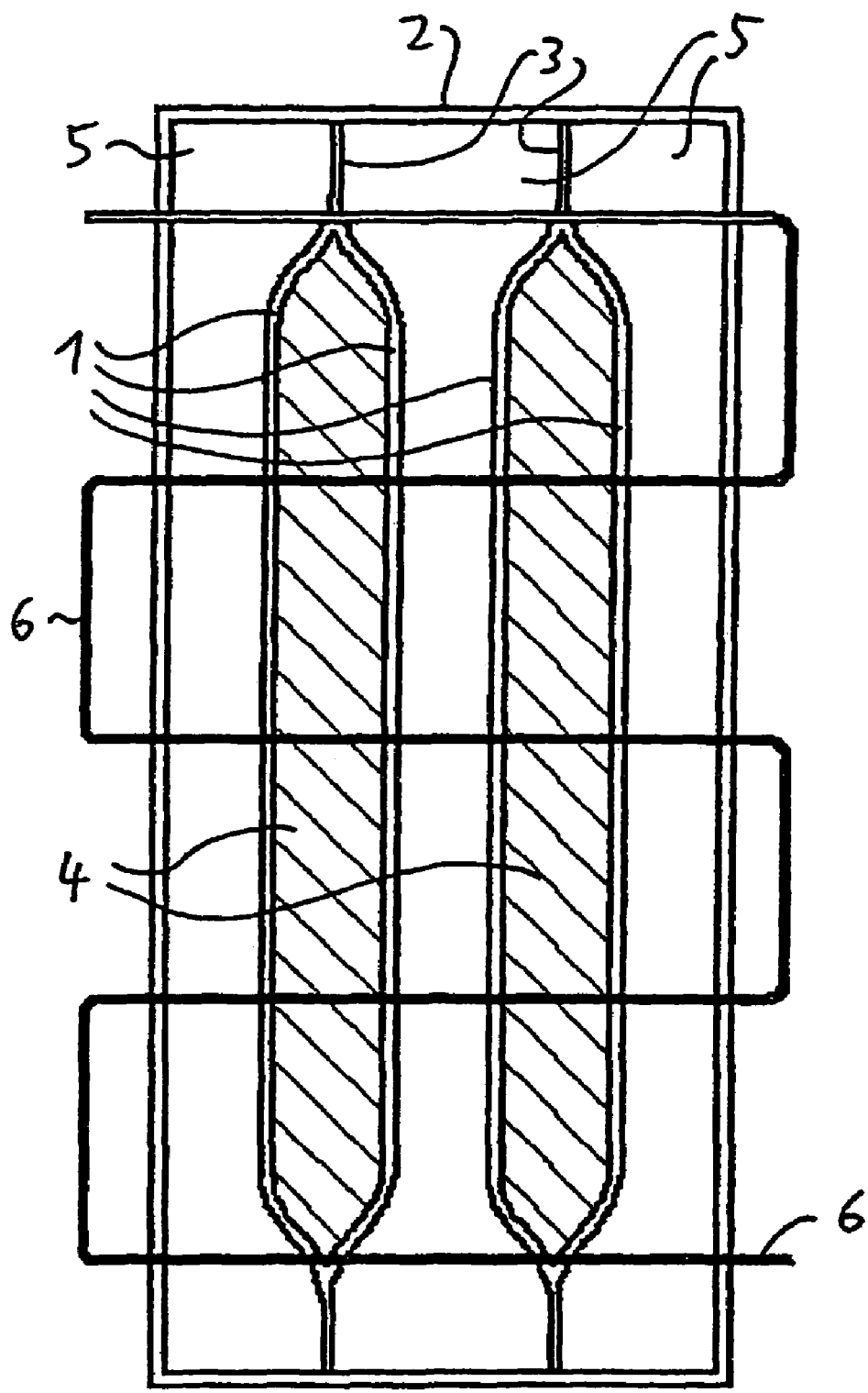
Figure 3:
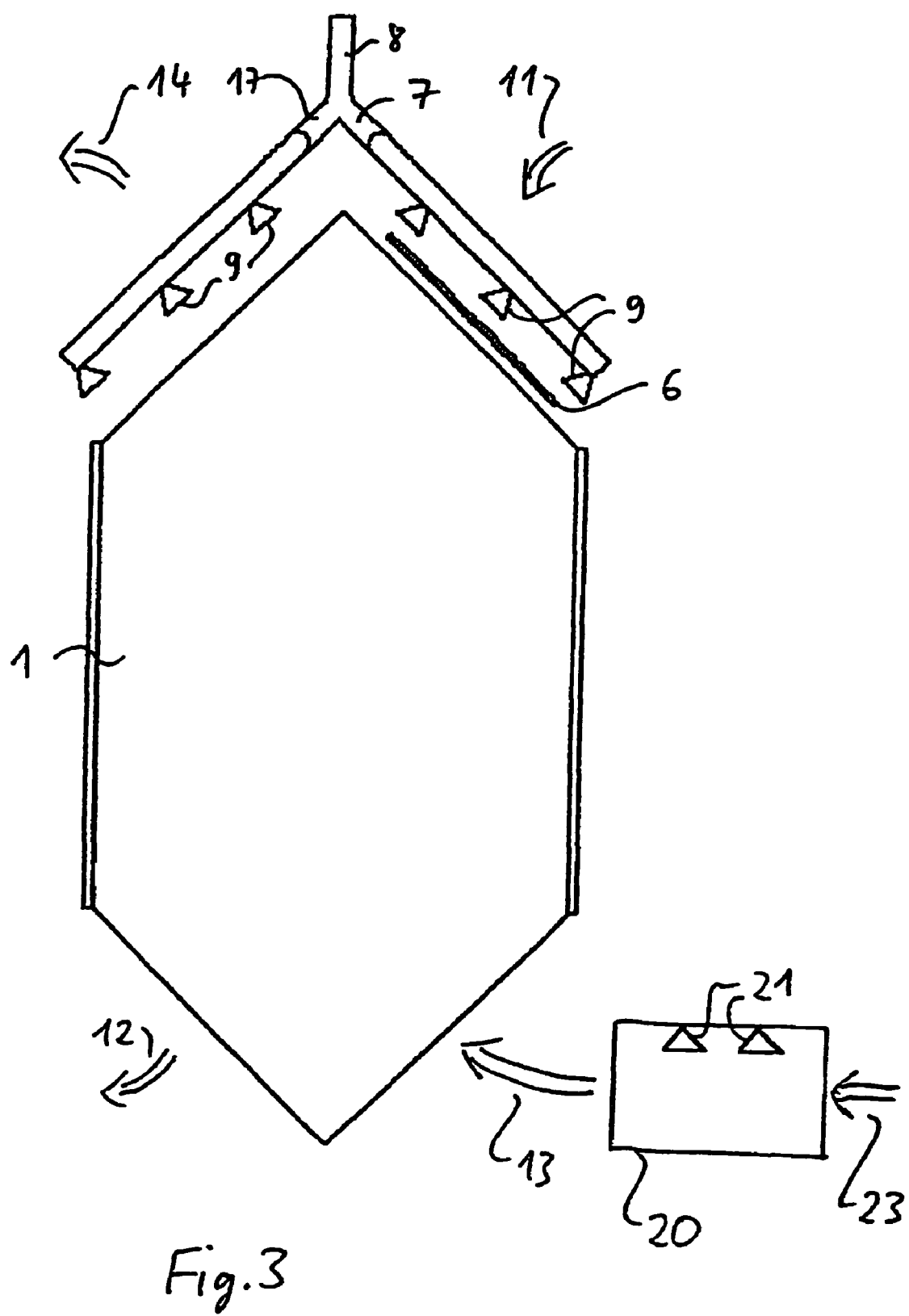

The invention, then, is explained in more detail by means of an illustrative exemplary embodiment, with reference to the drawings, in which:

FIG. 1 shows a respective illustration of a heat exchanger according to an exemplary embodiment of the invention, FIG. 2 shows a diagrammatic top view of the heat exchanger according to FIG. 1, and FIG. 3 shows a diagrammatic sectional side view of a heat exchanger according to FIG. 1.

FIG. 1 shows diagrammatically a plate heat exchanger according to an exemplary embodiment of the invention. The plate heat exchanger consists of approximately a multiplicity of plates 1 which are arranged parallel to one another. The plates 1 form a hexagonal outer shape, but any other shape may also be selected. The cavities resulting from the plates are illustrated in FIG. 2, the reference symbol 2 designating the closing-off side walls lying opposite one another.

FIG. 2 shows a diagrammatic part view of the principle of the plate heat exchanger according to FIG. 1 with a smaller number of plates 1 than is illustrated in FIG. 1. Between the side walls 2, two pairs of plates 1 are welded together at their lateral end regions 3 and are fastened to the outer walls 2. Other designs (for example, adhesive bonding) may also be envisaged. This results, between the respective pairs of plates 1, in the formation of cavities which are depicted by means of hatching in the drawing of FIG. 2. These cavities, designated by the reference symbol 4, may, for example, mark the air path which then leads the outside air 11 as incoming air 12 into the building. The remaining cavities predetermined by the outer walls and side walls 2 are designated in FIG. 2 by the reference symbol 5, and in the drawing they are therefore three in number. These are then the air paths of the spent exhaust air 13 which is discharged to the outside as outgoing air 14. The reference symbol 6 designates a meander-shaped electrode device which is arranged above the heat exchanger in the region of the outside air 11. The actual arrangement and function of said electrode device can be seen more clearly from the overview of FIG. 1 and the diagrammatic sketch of a detail in FIG. 3.

In FIG. 1, the arrow 11 indicates the path of inflowing outside air which flows into and between the plates in the top right part region of the image, the plates 1 being welded at the top of this right side of the device, so that this air flows into the cavities 5 from FIG. 2 and is transferred at the bottom on the left side of the image, according to the arrow 12, as incoming air into the rooms to be ventilated.

The exhaust air originating from the ventilated rooms is supplied, according to the arrow marked with the reference symbol 13, through line systems on the bottom right side of the heat exchanger and emerges from the latter again on its top left side. On this top left side of the heat exchanger, the pairs of plates 1 are configured in such a way that the air can emerge in the region hatched in FIG. 2 and bearing the reference symbol 4, while the cavities bearing the reference symbol 5 are closed there, since these receive the outside air 11 in the top right region. Said exhaust air 14 is then led away, according to the arrow, into the surroundings from the top left part of the heat exchanger by means of a discharging line system.

According to the exemplary embodiment, the electrode system 6 is arranged as a meander in the fresh air stream 11 of the plates 1, so that these electrodes, which are charged, for example, with a direct or alternating voltage of 10 kV with respect to the grounded plates, ionize particles which cause dust particles to adhere to the metallic heat exchanger, so that the air in the stream of incoming air 12 is purified. Instead of a meander, any other arrangement of electrodes may also be provided which allows a complete covering of the cross section of the supplied outside air 11 for the ionization of the latter.

Above the plates 1 of the heat exchanger, on one or on each of the two sides of the device, a spray nozzle system 7 and 17 is arranged, which, in the case presented, is fed from a central water supply 8 which is controlled, for example, via a separated valve, not illustrated in the fig., before the water flows into the fork-shaped water distributors 7 and 17. However, the shape of the water distributors 7 and 17 may also be configured to be other than fork-shaped. It is essential that a sufficient number of water dispensers 9 are arranged over the entire air stream surface 11 or 14, so that water discharged by the nozzles 9 fill, in principle, the entire air space 11 or 14 and, particularly in the region of the air stream 11 between the plates, that is to say in the hatched region 4 between the pairs of heat exchanger plates 1, also strikes the walls. The functioning of the device is described in more detail with reference to the diagrammatic sketch in FIG. 3. Identical features are designated by the same reference symbols in all the figures. It is pointed out, once again, that the heat exchanger elements are, of course, separated in the upper outgoing and lower outgoing region with respect to their median axis, so that an inflowing outside air stream 11 passes only as an incoming air stream 12 into the rooms to be ventilated, and so that an exhaust air stream 13 originating from these rooms is discharged only as an outgoing air stream 14 into the surroundings around the rooms. Intermixing or direct contact between the air streams does not take place in the heat exchanger. These air streams are separated from one another in each case by means of the plates 1 illustrated in FIG. 2. Thus, only a transfer of heat occurs. In the region upstream of the exhaust air stream 13, the ventilation line system is preceded by a cooling box 20. The latter receives the original exhaust air stream 23 and conducts it, after it flows through the cooling box 20, as a treated exhaust air stream 13 into the plate heat exchanger. The cooling box has a row of atomizing nozzles 21 which are fed from a water inflow, not illustrated, in particular also connected to the supply line 8. The atomizing nozzles 21 can spray out a fine water mist which essentially evaporates in the volume of the cooling box 20. The free diameter of the cooling box 20 may be designed to correspond to the throughflow diameter of the line system, while, in order to avoid turbulent flow components, the atomizing nozzles 21 are oriented laterally outside the line system diameter or, correspondingly oriented, in the line system.

The functioning of the device, then, is as follows. On normal operation days when no special treatment of the air is necessary, the heat exchangers operate in the way known from the prior art, which means that the usually colder outside air flow 11 absorbs the heat discharged by the exhaust air flow 13 via contact with the plates 1 and is discharged as warmed incoming air 12 into the room to be ventilated.

On especially hot days, then, the additional cooling of the invention can be switched on. This takes place by means of a periodic or continuous spraying of water out of the supply line and the atomizing nozzles 21 in and to the exhaust gas 23. The water, which is colder than the exhaust air stream 23, first cools this air stream. Further, the atomized water performs the function of an evaporation cooler which once again lowers the temperature of the exhaust air flow 13 emerging from the cooling box 20. This, at a passage through a plate heat exchanger, is then discharged as a very moist outgoing airflow 14 into the outside air.

It is consequently possible, as a result of this cooling of the air stream leading up to the building, to cool the outside air 11 which is very hot on a few summer days in Central Europe and is introduced into the plate heat exchanger, in order to make the temperature of the incoming airflow 12 compatible. Tests show temperature drops of 6 to 12° to be possible. Thus, at an outside temperature of, for example, 35° C., prevailing on a few days during the year, it is possible to supply air having a temperature of only 25° C. as incoming air in the living area, simply by a restricted water quantity being fed into and counter to the exhaust air stream 13.

In an advantageous embodiment of the invention, the water supply line 8 is distributed to the heat exchanger on both sides, so that nozzles 9 are present on both sides in the outside air region 11 and in the outgoing air region 14. It is consequently then possible, in periods of rest with the ionization electrode 6 pushed out, to flush out the cavities 4 and 5 with water, so that particles and other residues which has settled in the walls are washed out. The corresponding water accumulates in the lower region of the heat exchanger and is discharged there, for example, by one or more siphons.

It is also possible, of course to operate the installation designed for countercurrent in these fig. also in concurrent, that is to say, for example, to reverse the air stream 13 and 14. The same also applies to the air stream 11 and 12, if the electrode 6 is arranged further in the region of the outside airflow 11, up from the metallic heat exchanger, and the passage of the flow through the latter is also arranged further in the region of said outside airflow. Also, in principle, it is possible to cause inlets and outlets for the flows 11, 12, 13, and 14 to run in an uncrosed manner, so that, as an example, the outside air 11 and incoming air 12 are arranged on the right of the drawing and the exhaust 13 and outgoing air 14 are arranged on the left.

In particular, it is possible to cause the exhaust air 13 to flow in from above in spatial terms and the outside air 11, by contrast, to flow in from below in spatial terms. The electrode 6 would then also have to be arranged at the bottom upstream of the inflow of the outside air 11. It is then possible, by means of a configuration of the water distributors 17 according to FIG. 3, to arrange the atomizer nozzles 21 of the cooling box together with one, in spatial terms in the vicinity of the purifying nozzles 9, so that the evaporation of atomized water takes place in the region of the inflow of the exhaust air 13. Thus, a separate cooling box 20 could be dispensed with, and original exhaust air 13 and cooled exhaust air 23 would almost coincide in spatial terms.

On the basis of this technical teaching, it is possible to have a series of modifications which are to be covered in a corresponding way by the scope of the invention predetermined by the appended claims.

It is additionally advantageous to produce the plates of the plate heat exchanger 1 from a chromium/nickel/steel alloy which, in interaction with flushing with water, makes it possible to have odor filtration. Thus, by means of periodically controlled operation, the plate heat exchanger can be purified of the ionized particles of the electrode filter and, at the same time, the surface provided with the respective alloy can be freed of the odor deposits. In particular, at least parts of said conductive plates 1 of the first air stream 11, 12 can have a purification-active region which preferably consists of high concentrate steel bearing the material numbers 1.4571 or 1.4301 according to the teaching of WO 01/52711. A final cutting machining of the surface would additionally be possible.

Instead of this water jet, the cleaning of the electrode surface, that is to say of the plates 1, may also be carried out by means of an air jet or a manual brush.

The invention claimed is:

1. A heat exchanger for the exchange of heat between a first air stream and a second air stream, comprising:
   a plurality of plates delimiting first and second exchange spaces disposed next to each other in a direction transverse with respect to the plates, with each of the first exchange spaces at least one plate is conductive and wherein said first air stream is adapted to flow through said first exchange spaces, and said second air stream is adapted to flow through said second exchange spaces;
   an ionization device for ionizing particles entrained in said first air stream so that the particles deposit at said conductive plates of the first exchange spaces;
   a water distribution system with nozzles for periodically discharging water into said first exchange spaces for cleaning the plates of the heat exchanger from deposited particles, bacteria, algae and other deposits; and
   a water collection device provided in a lower region of the heat exchanger for discharging collected water.

2. The heat exchanger according to claim 1 wherein the water distribution system comprises means for discharging water into the second exchange spaces for cleaning the second exchange spaces.

3. The heat exchanger according to claim 1 wherein the water distribution system comprises atomizing nozzles for spraying water as fine mist into the second exchange spaces for cooling said second air stream.

4. The heat exchanger according to claim 2 wherein the water distribution system further comprises atomizing nozzles for spraying water as fine mist into the second exchange spaces.

5. The heat exchanger according to claim 1 wherein at least parts of said conductive plates have an active purification region consisting of high-grade steel bearing one of the material numbers selected from 1.4571 and 1.4301.

6. The heat exchanger according to claim 2 wherein at least parts of said conductive plates have an active purification region consisting of high-grade steel bearing the material numbers 1.4571 or 1.4301.

7. The heat exchanger according to claim 3 wherein at least parts of said conductive plates have an active purification region consisting of high-grade steel bearing one of the material numbers selected from 1.4571 and 1.4301.

8. The heat exchanger according to claim 4 wherein at least parts of said conductive plates have an active purification region consisting of high-grade steel bearing the material numbers 1.4571 or 1.4301.

9. The heat exchanger according to claim 1 wherein the ionization device comprises an ionization filament network charged with a high DC voltage and wherein said conductive plates are at ground potential.

10. The heat exchanger according to claim 2 wherein the ionization device comprises an ionization filament network charged with a high DC voltage and wherein said conductive plates are at ground potential.

11. The heat exchanger according to claim 3 wherein the ionization device comprises an ionization filament network charged with a high DC voltage and wherein said conductive plates are at ground potential.

12. The heat exchanger according to claim 4 wherein the ionization device comprises an ionization filament network charged with a high DC voltage and wherein said conductive plates are at ground potential.

13. The heat exchanger according to claim 5 wherein the ionization device comprises an ionization filament network charged with a high DC voltage and wherein said conductive plates are at ground potential.

14. The heat exchanger according to claim 6 wherein the ionization device comprises an ionization filament network charged with a high DC voltage and wherein said conductive plates are at ground potential.

15. The heat exchanger according to claim 7 wherein the ionization device comprises an ionization filament network charged with a high DC voltage and wherein said conductive plates are at ground potential.

16. The heat exchanger according to claim 8 wherein the ionization device comprises an ionization filament network charged with a high DC voltage and wherein said conductive plates are at ground potential.

* * * * *